(12) United States Patent
Kim

(10) Patent No.: US 7,185,119 B2
(45) Date of Patent: Feb. 27, 2007

(54) METHOD AND APPARATUS FOR CHECKING AND ANALYZING THE STATE OF PERIPHERALS WHEREIN STATE INFORMATION IS CONVERTED INTO A PATTERN OF IDENTIFICATION INFORMATION

(75) Inventor: Young-hye Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/353,869

(22) Filed: Jan. 30, 2003

(65) Prior Publication Data

US 2003/0196008 A1   Oct. 16, 2003

(30) Foreign Application Priority Data

Apr. 11, 2002   (KR) ............................... 2002-19720

(51) Int. Cl.
*G06F 3/00*   (2006.01)
(52) U.S. Cl. ............................ 710/19; 710/15; 710/18; 714/47
(58) Field of Classification Search ................. 710/18, 710/19, 15; 714/47
See application file for complete search history.

(56) References Cited

U.S. PATENT DOCUMENTS

| 6,122,639 | A  | * | 9/2000  | Babu et al. ............. 707/103 R |
| 6,192,034 | B1 | * | 2/2001  | Hsieh et al. ................. 370/241 |
| 6,314,476 | B1 | * | 11/2001 | Ohara .......................... 710/15 |
| 6,430,711 | B1 | * | 8/2002  | Sekizawa ..................... 714/47 |
| 2003/0072027 | A1 | * | 4/2003 | Haines et al. ............... 358/1.15 |

FOREIGN PATENT DOCUMENTS

| JP | 63-141155 | 6/1988 |
| JP | 2001-167075 | 6/2001 |

* cited by examiner

*Primary Examiner*—Tammara Peyton
(74) *Attorney, Agent, or Firm*—Staas & Halsey LLP

(57) ABSTRACT

A method and system checking a state of a peripheral without help of a special I/O module regardless of port types between the peripheral and a state-requiring device can be achieved by adding state information representing detailed state of the peripheral to an identification region of the peripheral having identification information identifying the peripheral, and transferring the identification region with the state information to the state-requiring device. The state of the peripheral is analyzed using the state information extracted from the identification region received by the state-requiring device.

11 Claims, 4 Drawing Sheets

METHOD AND APPARATUS FOR CHECKING AND ANALYZING THE STATE OF PERIPHERALS WHEREIN STATE INFORMATION IS CONVERTED INTO A PATTERN OF IDENTIFICATION INFORMATION

CROSS-REFERENCE TO RELATED APPLICATIONS

This application claims the benefit of Korean Application No. 2002-19720 filed Apr. 11, 2002, in the Korean Intellectual Property Office, the disclosure of which is incorporated herein by reference.

BACKGROUND OF THE INVENTION

1. Field of the Invention

The present invention relates to peripherals like printers or scanners, and more particularly, to a method and system checking a state of a peripheral.

2. Description of the Related Art

To check states of peripherals, peripheral manufacturers have to make their own input/output (I/O) modules that execute in a state-requiring/requesting device (e.g., a personal computer) and in a peripheral (e.g., a printer) controlled by or in communication with the state-requiring device. In case of operating system (OS) upgrades the manufacturers could perform input/output processing successfully by developing their own I/O modules (manufacturer-specific) to catch up with (to accommodate) each operating system version. However, this can be time consuming and increases costs.

To help this problem, three conventional methods of checking the states of peripherals without help of manufacturer-specific I/O modules have been provided. More particularly, two of the conventional methods use an I/O module in a peripheral that exchanges control information and data with an I/O module in a state-requiring device, based upon communication protocol standards, such as the IEEE 1284 bi-directional peripheral interface for personal computers standards (i.e., use a non-manufacturer specific I/O module).

To facilitate understanding of the three conventional methods, a personal computer is used as an example state-requiring device checking the states of their peripherals. According to the first conventional method, personal computers send or write particular commands to peripherals connected to them and receive or read responses from the peripherals, to acquire state information on the states of the peripherals. According to the second conventional method, personal computers periodically poll their peripherals until they receive responses from the peripherals indicating that state information has been sent. According to the third conventional method, data indicating a simple state, such as a busy state BUSY or an idle state IDLE, is added to identification information allowing personal computers to identify their peripherals and to receive the additional data added to identification information, recognizing whether their identified peripherals are in a busy state or in an idle state. Here, BUSY represents that the peripherals are performing some operations, and IDLE represents that peripherals are not performing certain operations.

However, peripheral manufacturers still cannot perform input/output interfacing operations freely or without restrictions with all types of operating system versions or various operating systems (e.g., MICROSOFT WINDOWS, MACINTOSH, etc.) through the above-described first and second conventional methods. This is because there is no universal I/O module with respect to all types of operating system versions, such as different hardware platform operating system versions or various operating systems, thereby making I/O interfacing by a peripheral with a state-requiring device that is controlled by various/different operating systems difficult. These problems can become more evident/compounded when exchanging data and/or control information according to the IEEE 1284 bi-directional peripheral interface for personal computers standards.

In addition, when the above-described first or second method is used, bi-directional communications through responses puts a big processing load on the personal computers, thus inconveniencing computer users by slowing information processing.

The third conventional method has a problem that it can only check the simple states of the peripherals and cannot check the detailed states of the peripherals.

SUMMARY OF THE INVENTION

To solve the above-described and/or other problems, the present invention provides a method of checking states of peripherals without help of separately-manufactured input/output modules (i.e., separately manufactured input/output modules would only be used to exchange data, if desired, and are not used to exchange control information, between a peripheral and a state-requiring device).

To solve the above-described and/or other problems, the present invention provides an apparatus checking states of peripherals without input/output modules.

Additional advantages of the invention will be set forth in part in the description which follows and, in part, will be obvious from the description, or may be learned by practice of the invention.

The present invention provides a method of checking a state of a peripheral having identification information representing its identity, comprising adding state information representing detailed state of the peripheral to an identification region having the identification information in the peripheral, and transferring the identification region with the state information to a host, and analyzing a state of the peripheral using the state information extracted from the transferred identification region.

Further, the present invention provides an apparatus checking a state of a peripheral having identification information representing identity of the peripheral, comprising a state analysis unit extracting state information from an identification region received from the peripheral, and analyzing a state of the peripheral using the extracted state information. Further, the peripheral adds the state information representing at least one detailed state of the peripheral to the identification region with the identification information of the peripheral and transfers the identification region to the state analysis unit.

The present invention also provides an apparatus, comprising a peripheral, comprising a transfer determiner determining whether there is a need to transfer a state of the peripheral and outputting a result of the determination as a control signal, a state checker checking the state of the peripheral in response to the control signal and outputting state data representing the checked state of the peripheral, a pattern converter converting a pattern of the state data into a pattern of identification information of the peripheral and outputting the pattern-converted state data as state information of the peripheral, an information adder adding the state information to an identification region of the peripheral containing the identification information and outputting the identification region with the added state information, and a transferor transferring the identification region with the state information; and a host computing device in communication with the peripheral and comprising a programmed computer processor as a state analyzer receiving the transferred identification region with the added state information representing at least one detailed state of the peripheral from the peripheral, extracting the state information from the received identification region, analyzing the state of the peripheral using the extracted state information, and outputting an analyzed result.

BRIEF DESCRIPTION OF THE DRAWINGS

The above advantages of the present invention will become more apparent by describing in detail an embodiment thereof with reference to the attached drawings in which.

DETAILED DESCRIPTION OF THE PREFERRED EMBODIMENTS

Figure 1:
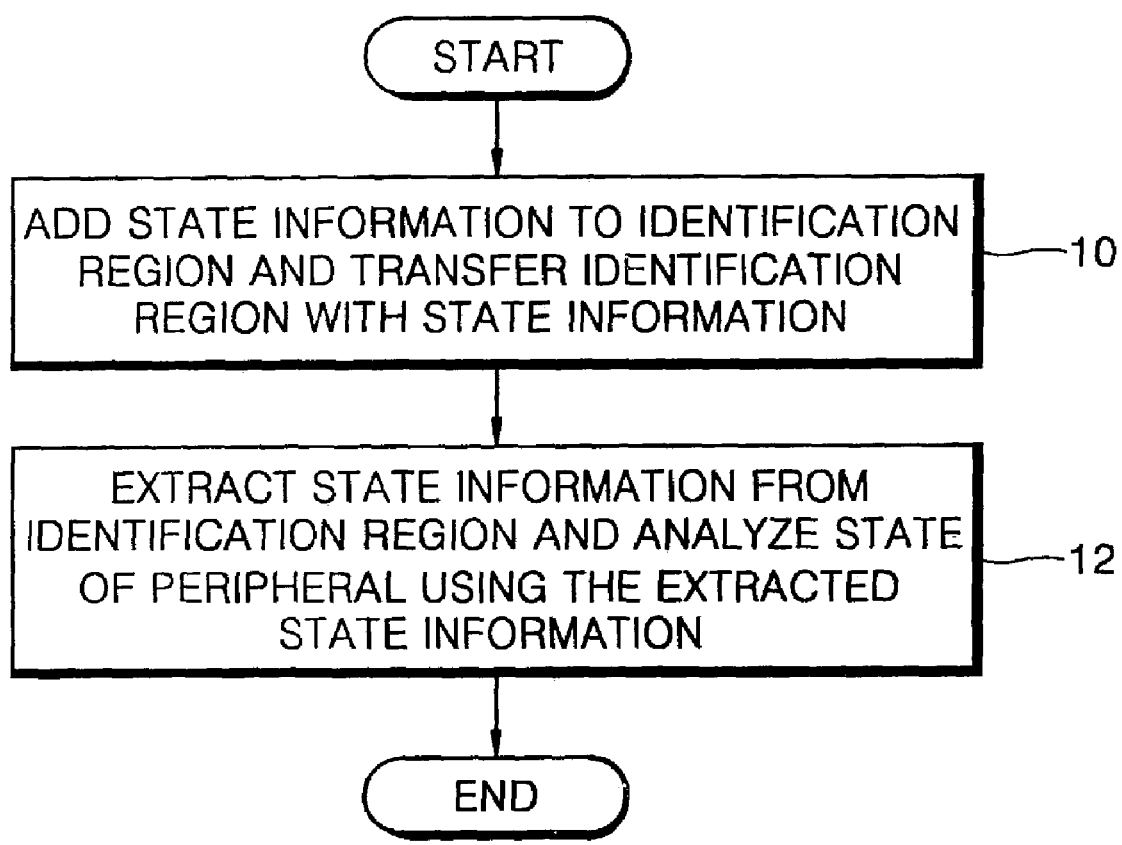
FIG. 1 is a flowchart of checking a state of a peripheral, according to the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

In FIG. 1, a method of checking a state of a peripheral comprises adding state information to an identification information region in a peripheral, transferring the identification information region with the state information and analyzing a state of the peripheral using the received state information.

Figure 4:
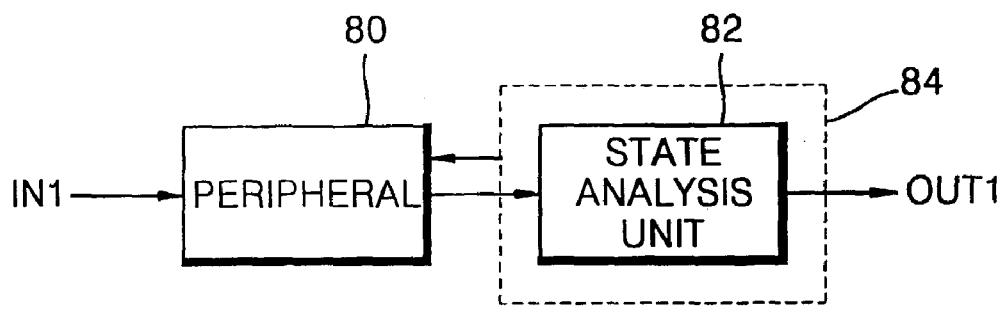
FIG. 4 is a block diagram of a peripheral state checking system embodying the peripheral state checking process shown in FIG. 1.

Referring to FIGS. 1 and 4, as operation 10, state information on a state of a peripheral 80 is added to an identification region in the peripheral 80, and the identification region with the state information is transferred to devices 84, such as a personal computer (not shown) or other peripherals (not shown), which require the state of the peripheral 80. Hereinafter, the devices 84 are referred to as state requiring units 84. The peripheral 80 has identification information, which represents identity of the peripheral 80 and is stored in the identification region. Typically, the identification region can be deemed as a kind of data. That is, typically, the identification region relates to a data format, such as a packet format as related to data communication, and having a variety of regions (or sections), for example, a header section and a data section, etc. According to the present invention, a communication data format between a peripheral 80 and a device 84 has an identification region that has information related to the states, including detailed states, and identification of the peripheral. Accordingly, peripheral states can be checked without help of separately-manufactured input/output modules. Separately manufactured input/output modules may be used to only exchange data, and such input/output modules would not be used to exchange control information between a peripheral and a state-requiring device. Exchanging control information with peripherals without I/O modules improves communication and/or processing efficiency and allows OS-independent control/peripheral state checking by using standard port interfaces of the peripheral and the state requiring device instead of the input/output modules.

The identification information stored in the identification region of the peripheral 80 can indicate, for example, a printer or scanner. For example, the identification information can be represented as "MFR: Samsung; Model: Samsung Printer; CODE: 10001," which means that a manufacturer (MFR) of a peripheral 80 is Samsung Electronics Ltd., a model name of the peripheral 80 is a Samsung printer, and a unique code representing a state of the peripheral 80 is '10001.' The identification information is used by a state-requiring device 84, such as a personal computer 84 or another peripheral 84, that receives the identification region transferred by the peripheral 80 to recognize the peripheral 80 from a plurality of other peripherals 80 in communication with the state requiring unit 84.

More particularly, the state information added to the identification region does not denote only a simple state of a peripheral 80, such as BUSY or IDLE, but can denote at least one detail state. Typically, the state information denotes at least one of detailed states, such as READY, INTERNAL_ERROR and COVER_OPEN, etc. For example, READY can denote that a peripheral 80 is ready to perform its own operation, INTERNAL_ERROR can denote that an error is generated within the peripheral 80, and COVER_OPEN can denote that the cover of the peripheral is open.

Figure 2:
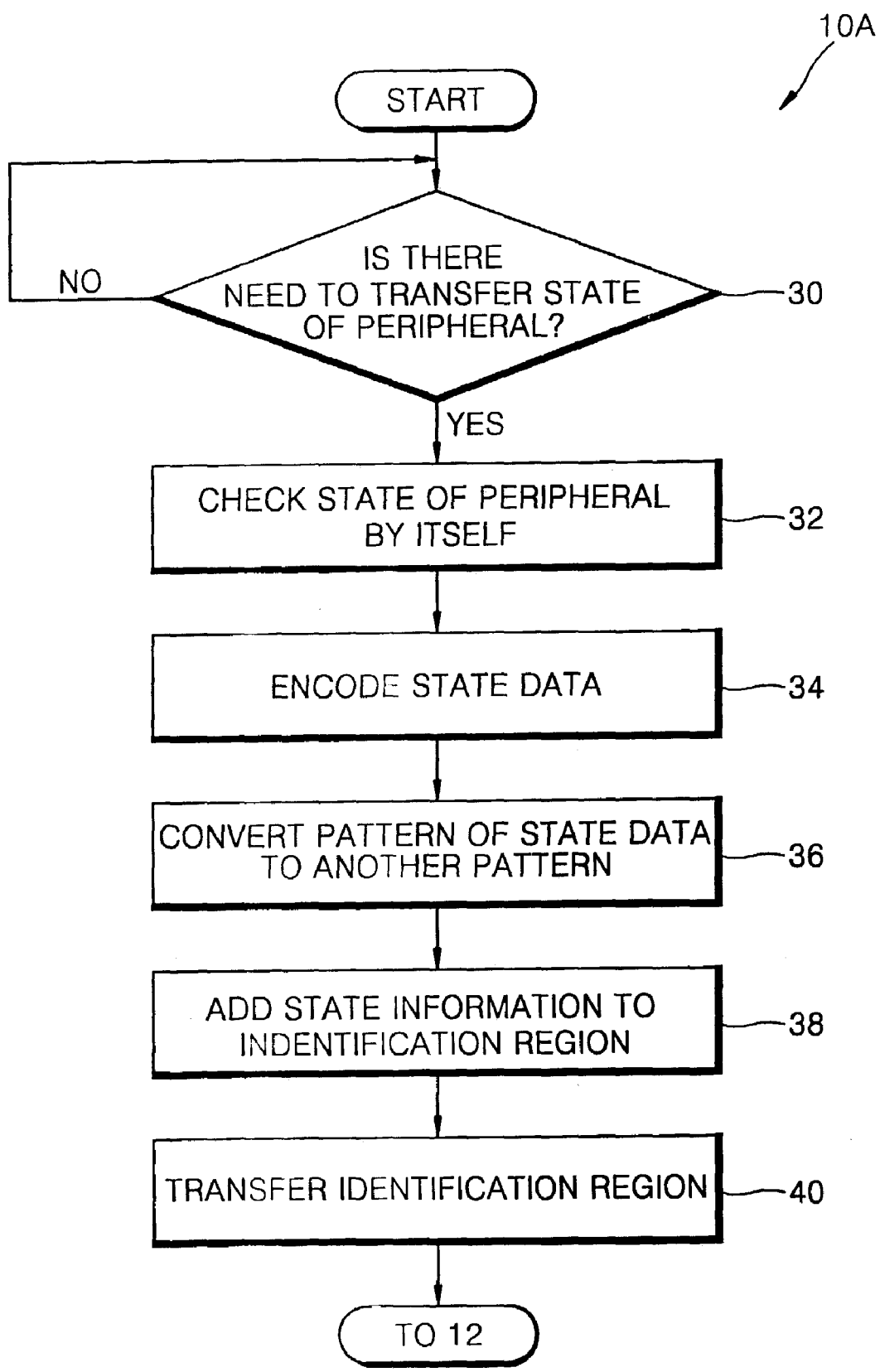
FIG. 2 is a flowchart of operation 10 shown in FIG. 1.

FIG. 2 is a flowchart of operation 10 shown in FIG. 1, according an embodiment 10A of the present invention. In FIG. 2, at operations 30 and 32, a state of a peripheral 80 is checked if transfer of the state of the peripheral 80 is needed/requested, for example, by a state-requiring device 84, and at operations 34 through 40 the state data is encoded according to a pattern (i.e., codes are assigned to determined states of the peripheral 80), the pattern of the state data is converted into another pattern, typically a pattern of the identification information of the peripheral 80, the pattern-converted state data is added to an identification region in the peripheral 80 and the identification region with the converted state data is transferred to the state-requiring device 84. A pattern can be an encoding standard, such as the ASCII code, an object description in case of an object-oriented programming environment, a data structure, etc.

More particularly, in FIG. 2, at operation 30 a determination is made whether transfer of a state of a peripheral 80 is needed/requested. The transfer of the state of the peripheral 80 can be demanded by external devices 84 in communication with the peripheral 80 or by the peripheral 80 itself. More particularly, a personal computer 84 in communication with a peripheral 80 can demand a state of the peripheral 80 from the peripheral 80, or the peripheral 80 itself can determine necessity of informing the personal computer 84 of its own state, even though the personal computer 84 did not demand the state of the peripheral 80.

If, at operation 30, it is determined that transfer of the state of a peripheral 80 is needed/requested, at operation 32, the peripheral 80 checks its own state. At operation 34, the peripheral 34 encodes state data representing its own checked state according to a pattern. At operation 34, encoding of the state data allows transferring two or more states in a single data transmission unit (e.g., a byte, a word, a packet, etc.). According to an aspect of the present invention, state data can correspond to characters, such as numbers, letters or symbols, to be analyzed by the state-requiring device 84.

At operation 36, the pattern of the encoded state data is converted into a pattern of identification information of the peripheral 80, and at operation 36, the encoded state data with the converted pattern can be transferred as state information. According to an aspect of the present invention, the pattern of the identification information can be an ASCII code pattern. In this case, the pattern of the encoded state data is converted into the ASCII code pattern.

According to an aspect of the present invention, operation 34 can be omitted. In this case, a pattern of state data representing the state of the peripheral 80 checked at operation 32 is converted into the same pattern of the identification information of the peripheral 80, and the pattern-converted state data can be transferred as the state information.

At operation 38, the state information from operation 36 is added to an identification region of the peripheral 80. At operation 40, the identification region is transferred to a personal computer 84 or another peripheral 84. After operation 40, control of the state checking process flows to operation 12. Referring back to FIG. 1, at operation 12, the state of the peripheral 80 is analyzed using the state information extracted from the identification region transferred from the peripheral 80.

Figure 3:
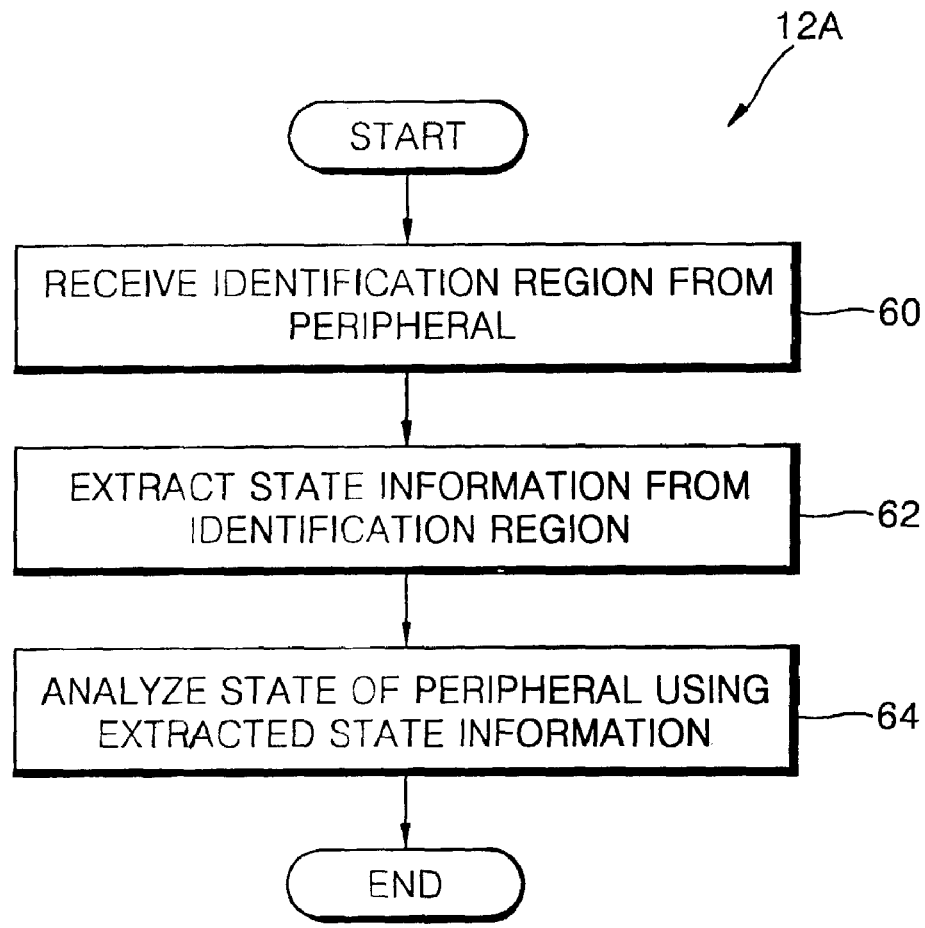
FIG. 3 is a flowchart of operation 12 shown in FIG. 1.

FIG. 3 is a flowchart of operation 12 shown in FIG. 1, according to an embodiment 12A of the present invention. In FIG. 3, at operations 60, 62 and 64 a state of a peripheral 80 is analyzed using state information extracted from identification region transferred from the peripheral 80. More particularly, at operation 60, an identification region in the peripheral 80 having state information and identification information of the peripheral 80 is transferred from the peripheral 80 to a state-requiring device 84. At operation 62, the state information is extracted from the received identification region. At operation 64, the state of the peripheral 80 is analyzed using the extracted state information.

The structure and operation of a peripheral state checking system that performs the peripheral state checking process, shown in FIG. 1, will now be described with reference to FIGS. 1 through 6. FIG. 4 is a block diagram of the peripheral state checking system embodying the peripheral state checking process shown in FIG. 1. The peripheral state checking system comprises a peripheral 80 and a state-requiring device 84 executing a state analysis unit 82.

To perform operation 10, the peripheral 80 of FIG. 4 receives/contains identification information, which represents identity of the peripheral 80. The peripheral identification information can be input, for example, through an input port IN1. At operation 10, the peripheral 80 adds state information representing at least one state, which can include any detailed states, of the peripheral 80 to an identification region, and transfers the identification region to the state analysis unit 82 of the state-requiring device 84. The peripheral identification information can already exist within the peripheral 80 instead of being received through the input port IN1 from an external source. The peripheral 80 and the state-requiring unit 84 can exchange data with each other through known communication ports using an I/O module implementing known communication protocol standards, such as the IEEE 1284 standards. Although, control information (e.g., state information) is exchanged between the peripheral 80 and the state-requiring device without help of the I/O module.

Figure 5:
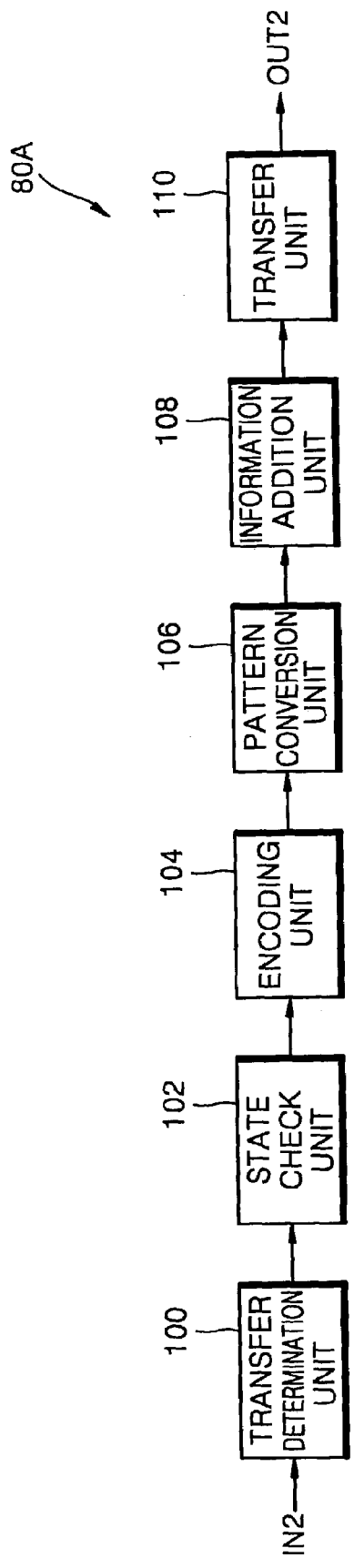
FIG. 5 is a block diagram of an embodiment of a peripheral shown in FIG. 4.

FIG. 5 is a block diagram of an embodiment 80A of the peripheral 80 shown in FIG. 4. The embodiment 80A comprises a transfer determination unit 100, a state check unit 102, an encoding unit 104, a pattern conversion unit 106, an information addition unit 108 and a transfer unit 110. In FIG. 2, at operation 30, the transfer determination unit 100 of FIG. 5 determines whether a transfer of a state of the peripheral 80 is needed and outputs a result of the determination to the state check unit 102 as a control signal to check the state of the peripheral 80 at operation 32.

For example, when a state request signal is received by the peripheral 80 from an external personal computer 84 or another peripheral 84 through an input port IN2, the transfer determination unit 100 generates/outputs a control signal to the state check unit 102. On the other hand, when the transfer determination unit 100 determines by itself that a transfer of the state of the peripheral 80 is needed, the transfer determination unit 100 generates/outputs a control signal to the state check unit 102.

At operation 32, the state check unit 102 checks the state of the peripheral 80 in response to the control signal received from the transfer determination unit 100, and outputs state data representing the checked state of the peripheral 80 to the encoding unit 104. That is, when the state check unit 102 recognizes from the received control signal that transfer of the state of the peripheral 80 is needed, the state check unit 102 checks the state of the peripheral 80.

At operation 34, the encoding unit 104 encodes according to a pattern the state data received from the state check unit 102 and outputs the encoded state data to the pattern conversion unit 106. At operation 36, the pattern conversion unit 106 converts the pattern of the encoded state data received from the encoding unit 104 into the same pattern of identification information of the peripheral 80 and outputs the pattern-converted state data to the information addition unit 108 to serve as state information. According to an aspect of the present invention, the encoding unit 104 can be omitted from the peripheral 80A. In this case, at operation 36, the pattern conversion unit 106 converts a pattern of the state data received from the state check unit 102 into the same pattern of the identification information of the peripheral 80 and outputs the pattern-converted state data to the information addition unit 108 to serve as state information.

At operation 38, the information addition unit 108 adds the state information received from the pattern conversion unit 106 to the identification region in the peripheral 80 and outputs the identification region with the added state information to the transfer unit 110. More particularly, the pattern conversion unit 106 converts the pattern of the encoded or the non-encoded state data to the same pattern of the identification regions, thereby allowing the information addition unit 108 to add the state information to the identification region. Therefore, only when the pattern of state information is converted into the same pattern of the identification information of the peripheral 80, can the state information be added along with/to the identification information to the identification region.

At operation 40, the transfer unit 110 transfers the identification region received from the information addition unit 108 to the state analysis unit 82 of the state-requiring device 84 through an output port OUT2. More particularly, the transfer unit 110 and the state analysis unit 82 use standard port interfaces provided in the peripheral 80 and the state-requiring device 80, respectively, (e.g., serial, parallel, Universal Serial Bus or USB, etc.) to transceive information to/from the identification information region between the peripheral 80 and the state-requiring device 84.

Referring back to FIG. 4, the state analysis unit 82 of the state-requiring device 84 extracts state information from the identification region received from the peripheral 80, analyzes the state of the peripheral 80 using the extracted state information, and outputs the analyzed state of the peripheral 80 through an output port OUT1, for example, to an application software. As described above, the state requiring unit 84 can be a device requiring a state of a peripheral 80, and can be, for example, a personal computer or another peripheral 84. For example, a personal computer 84 or another peripheral 84 including the state analysis unit 82 can control the peripheral 80 using/based upon the analyzed state of the peripheral 80.

Figure 6:
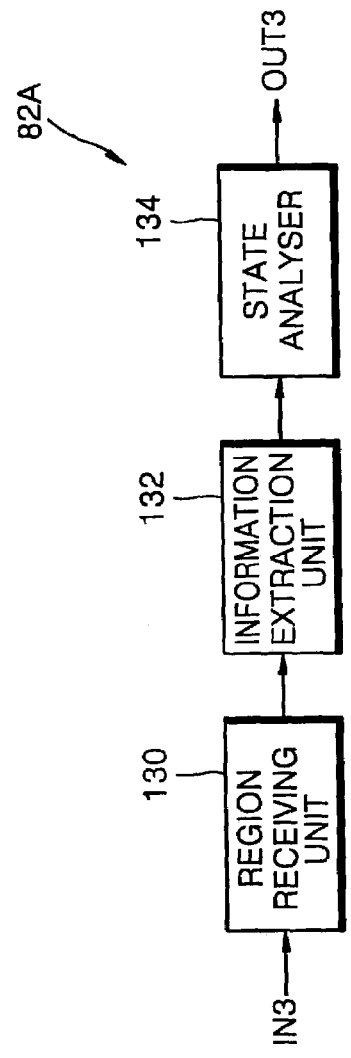
FIG. 6 is a block diagram of an embodiment of a state analysis unit shown in FIG. 4.

FIG. 6 is a block diagram of an embodiment 82A of the state analysis unit 82 shown in FIG. 4. The embodiment 82A comprises a region receiving unit 130, an information extraction unit 132 and a state analyzer 134.

In FIG. 3, at operation 60, the region receiving unit 130 of FIG. 6 receives an identification region transferred from the peripheral 80 through an input port IN3 and outputs the received identification region to the information extraction unit 132. At operation 62, the information extraction unit 132 extracts the state information from the identification region received from the region receiving unit 130 and outputs the extracted state information to the state analyzer 134. At operation 64, the state analyzer 134 analyzes a state of the peripheral 80 using the extracted state information received from the information extraction unit 132 and outputs the analyzed state of the peripheral 80 through an output port OUT3, for example, to an application software.

Further, even though a manufacturer of the peripheral 80 does not provide any I/O module for the peripheral 80, a personal computer or another peripheral implementing the state analysis unit 82 still can easily read only identification information of the peripheral 80. Thus, even when no I/O modules are provided in the peripheral 80 and in the state-requiring device 84, the state analysis unit 82 can analyze detail states of the peripheral 80 using state information extracted from the read identification region received from the peripheral 80 and control the peripheral 80 based upon the analyzed state of the peripheral 80.

More particularly, the method and system checking a state of a peripheral according to the present invention can easily and stably check the state of the peripheral 80 without help of a special I/O module regardless of the types of communication ports provided between the peripheral 80 and the state analysis unit 82 by using standard port interfaces (e.g., serial, parallel, Universal Serial Bus or USB, etc.) provided in the peripheral 80 and the state-requiring device 84. Further, because a special I/O module is not used to check a state of a peripheral, a state-requiring device with upgraded operating system and/or with various types of operating systems can still check the state of the peripheral. Thus, a peripheral state checking method and system according to the present invention can reduce the cost of developing the peripheral 80, remove inconveniences to users of the peripheral 80 desiring to check the state of the peripheral 80 with updated or new operating system versions, and reduce the load upon a state requiring unit 84 caused by an I/O module. The processes of the present invention as embodied in the embodiments 80A and 82A are implemented in computing hardware and/or software.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of checking a state of a peripheral having identification information representing identity of the peripheral, the method comprising:
    adding state information representing a detailed state of the peripheral to an identification region and transferring the identification region with the state information to a host; and receiving by the host the transferred identification region with the state information and analyzing the state of the peripheral using the state information extracted from the received identification region, where the state information converted into a pattern of the identification information of the peripheral device that is stored in the identification region.

2. The method of claim 1, wherein the addition of the state information to the identification information, comprises:
    determining whether there is a need to transfer the state of the peripheral;
    checking the state of the peripheral, if determined that the state of the peripheral is needed to be transferred;
    converting a pattern of state data indicating the checked state of the peripheral into a pattern of the identification information as the state information;
    adding the state information to the identification region; and
    transferring the identification region with the state information.

3. The method of claim 1, wherein the state information is transferred between the peripheral and a state-requiring device using any type of communication ports thereof.

4. The method of claim 2, wherein the addition of the state information to the identification region further comprises encoding the state data representing the checked state of the peripheral.

5. The method of claim 4, wherein the state data is a character.

6. The method of claim 2, wherein the pattern of the identification information corresponds to an ASCII code pattern.

7. The method of claim 1, wherein the receiving of the identification region comprises:
    receiving the identification region from the peripheral;
    extracting the state information from the identification region; and
    analyzing the state of the peripheral using the extracted state information.

8. An apparatus checking a state of a peripheral having identification information representing identity of the peripheral, the apparatus comprising:
    a programmed computer processor as a state analyzer receiving an identification region with added state information representing at least one detailed state of the peripheral from the peripheral, extracting the state information from the received identification region, analyzing the state of the peripheral using the extracted state information, and outputting an analyzed result, where the state information is converted into a pattern of the identification information of the peripheral device that is stored in the identification region.

9. The apparatus of claim 8, wherein the state analyzer is a processing component of a personal computer.

10. The apparatus of claim 8, wherein the state analyzer corresponds to another peripheral.

11. A method of checking a state of a peripheral device, comprising:

determining at least one state of the peripheral device via a host by extracting state information from an identification region received from the peripheral device, where the state information is independent of a format specific to the peripheral device and has been converted into a pattern of identification information of the peripheral device that is stored in the identification region and that represents the identity of the peripheral device.

* * * * *

UNITED STATES PATENT AND TRADEMARK OFFICE
CERTIFICATE OF CORRECTION

| | | |
|---|---|---|
| PATENT NO. | : 7,185,119 B2 | Page 1 of 1 |
| APPLICATION NO. | : 10/353869 | |
| DATED | : February 27, 2007 | |
| INVENTOR(S) | : Young-hye Kim | |

It is certified that error appears in the above-identified patent and that said Letters Patent is hereby corrected as shown below:

Column 8, Line 15, after "information" insert --is--.

Signed and Sealed this

Twelfth Day of June, 2007

JON W. DUDAS
*Director of the United States Patent and Trademark Office*